US006910046B2

United States Patent
Daimon et al.

(10) Patent No.: US 6,910,046 B2
(45) Date of Patent: Jun. 21, 2005

(54) INFORMATION LIST GENERATION APPARATUS AND RECORDING MEDIUM STORING PROGRAM THEREOF

(75) Inventors: Masaaki Daimon, Kawasaki (JP); Toshiro Shibanuma, Kawasaki (JP); Hisayasu Nakao, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 412 days.

(21) Appl. No.: 10/083,126

(22) Filed: Feb. 27, 2002

(65) Prior Publication Data

US 2003/0052925 A1 Mar. 20, 2003

(30) Foreign Application Priority Data

Sep. 20, 2001 (JP) ........................................ 2001-287889

(51) Int. Cl.[7] .............................................. G06F 17/30
(52) U.S. Cl. ........................ 707/102; 707/10; 707/200; 709/217; 345/356
(58) Field of Search .......................... 707/10, 100, 102, 707/200; 715/513; 705/8, 51; 706/50; 709/206, 217; 719/310, 330; 345/356

(56) References Cited

U.S. PATENT DOCUMENTS

| 5,956,509 | A | * | 9/1999 | Kevner | 709/219 |
|---|---|---|---|---|---|
| 6,141,010 | A | | 10/2000 | Hoyle | |
| 6,195,462 | B1 | * | 2/2001 | Bryniarski et al. | 382/239 |
| 6,289,390 | B1 | * | 9/2001 | Kavner | 709/200 |
| 6,332,025 | B2 | * | 12/2001 | Takahashi et al. | 713/168 |
| 6,430,607 | B1 | * | 8/2002 | Kavner | 709/217 |
| 6,560,588 | B1 | * | 5/2003 | Minter | 707/100 |

FOREIGN PATENT DOCUMENTS

| EP | 795809 A | * | 9/1997 |
|---|---|---|---|
| JP | 7-288544 | | 10/1995 |
| JP | 9-200254 | | 7/1997 |
| WO | 99/55066 | | 10/1999 |

* cited by examiner

Primary Examiner—Shahid Alam
(74) Attorney, Agent, or Firm—Staas & Halsey LLP

(57) ABSTRACT

An information list generation apparatus and a program thereof visibly display important information in recorded information constantly in a high priority display position in a listing. That is, a server searches a message board database at a request of a member to display data on a message board, and edits display screen data of a groupware system based on the recorded data extracted in the search. Then, the server transmits the edited display screen data as a Web page to a client terminal. On the display of the message board, an article specified as a resident article is displayed in the highest priority display position in the display window regardless of the lapse of the recording date and time in the message board database. The resident article is followed by a predetermined number of normal articles having the latest recording dates and times.

8 Claims, 11 Drawing Sheets

| 16-1 | 16-2 | 16-3 | 16-4 | 16-5 | 16-6 |
|---|---|---|---|---|---|
| RECORDING DATE AND TIME | MESSAGE BOARD ID | MESSAGE BOARD NAME | TITLE | RECORDER | TEXT |
| 20010518 1435 | 1 | EDUCATION SECTION | EDUCATIONAL GUIDE IS AVAILABLE | MS. YAMASHITA | THE EDUCATION OF EMPLOYEE IN MIDDLE STANDING IN FIRST HALF OF 2001,... |
| 20010515 1011 | 2 | GENERAL AFFAIRS SECTION | FAULTY SERVER | MR. SUZUKI | THE PRINT SERVER ON 5F IS FAULTY... |
| 20010514 1649 | 2 | GENERAL AFFAIRS SECTION | SHARED PRINTER HAS BEEN REPAIRED | MR. SUZUKI | SINCE THE SHARED PRINTER HAS BEEN REPAIRED... |
| 20010512 1337 | 2 | GENERAL AFFAIRS SECTION | HOLDING A CLOSING PARTY | MR. FUJITA | IN CELEBRATION OF THE COMPLETION OF THE DEVELOPMENT OF THE NEW MODEL... |
| 20010510 1234 | 3 | RESIDENT ARTICLE | COUNTERMEASURE AGAINST VIRUS | MR. SUZUKI | THOSE WHO USE WINDOWS 2000 ARE REQUESTED TO IMMEDIATELY ... |
| ... | | | | | .. |

FIG. 3

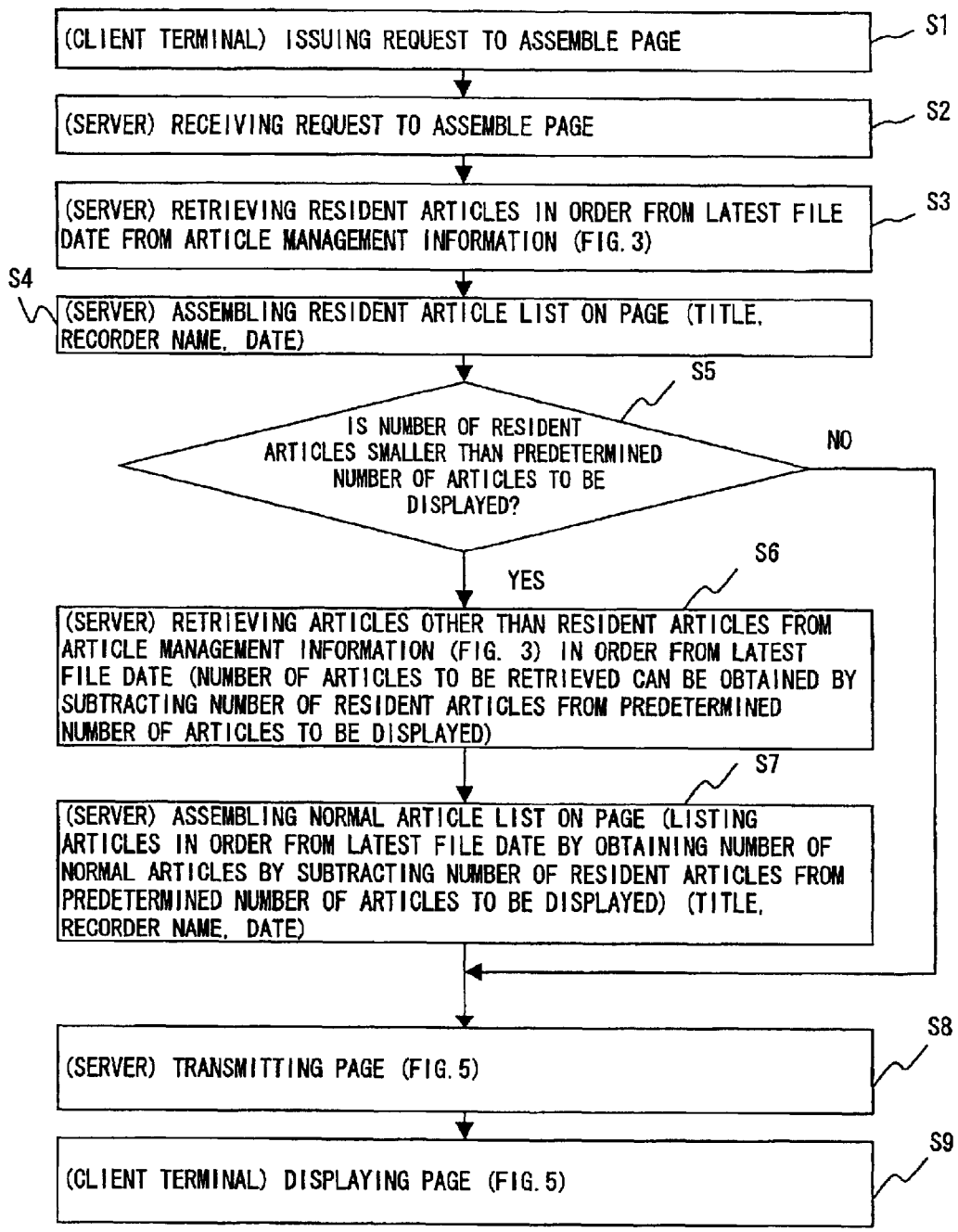
F I G. 4

FIG. 5

GROUPWARE

MESSAGE BOARD (IN ORDER OF RECORDING DATE AND TIME)

COUNTERMEASURE AGAINST VIRUS   MR. SUZUKI        5/10 12:34
EDUCATION GUIDE IS AVAILABLE   MS. YAMASHITA    5/18 14:35
FAULTY SERVER                  MR. SUZUKI        5/15 10:11
SHARED PRINTER HAS BEEN        MR. SUZUKI        5/14 16:49
REPAIRED
HOLDING A CLOSING PARTY        MR. FUJITA        5/12 12:37
ELECTRONIC CONFERENCE ROOM (IN ORDER OF RECORDING DATE
                             AND TIME)
HAS HIT UPON NEW PROJECT       MR. KAWASAKI     5/19  9:34
  /PROJECT IDEA/FOR WINTER/
MERCHANDISE RESEARCH/CAMPAIGN/ MR. OTA          5/16 15:00
THREE CODING METHODS SUGGESTED MR. NAKANO       5/16 11:58
  /KNOW-HOW/DEVELOPMENT/PROGRAMMING/
AGREE WITH RELAX ROOM          MR. KAMIYA       5/15 17:24
RELATING TO QUESTIONNAIRE
RESULT
  /FREE ROOM/OFFICE ENVIRONMENT/

DOCUMENT MANAGEMENT (IN ORDER OF RECORDING DATE AND TIME)

SECOND PROJECT.ppt                          MR. YAMADA       5/18 13:57
  /COMMON/PROJECT MATERIAL/IN 2001/
THIRD DEVELOPMENT DEPARTMENT MEETING PROCEEDINGS.txt
                                            MR. UEDA         5/18  9:32
  /THIRD DEVELOPMENT DEPARTMENT/DEPARTMENT
   MEETING PROCEEDINGS/
MARKET RESEARCH SEMINAR REPORT.doc MS. FUKUSHIMA 5/17 10:15
  /FIRST DEPARTMENT/EDUCATION/MEETING REPORT/SEMINAR/
WINTER MODEL LINE DRAWING.xt1    MR. MURATA      5/15 14:03
  /COMMON/PROCESS/IN 2001/WINTER/
FIRST PROJECT.ppt                MR./ SUZUKI     5/13 22:05
  /COMMON/PROJECT MATERIAL/IN 2001/

INFORMATION COLLECTION (IN ORDER OF RECORDING DATE AND TIME)

DISTRIBUTION OF SEASON PASS                GENERAL AFFAIRS SECTION
                                                           5/18 10:02
RELEASE OF NEW PRODUCT                     PUBLIC RELATIONS SECTION
                                                           5/17 14:00
OBTAINING INFORMATION THROUGH QUESTIONNAIRE
                                           GENERAL AFFAIRS SECTION
                                                           5/17 11:14
PERSONNEL CHANGE (NOTIFICATION)            GENERAL AFFAIRS SECTION
                                                           5/16 20:46
POWER FAILURE (NOTIFICATION)               GENERAL AFFAIRS SECTION
                                                           5/13  9:32
VISION OF THE COMPANY                      PRESIDENT   5/12 15:18

FIG. 6

GROUPWARE

| MESSAGE BOARD (IN ORDER OF RECORDING DATE AND TIME) | DOCUMENT MANAGEMENT (IN ORDER OF RECORDING DATE AND TIME) |
|---|---|
| COUNTERMEASURE AGAINST VIRUS   MR. SUZUKI   5/10 12:34 | SECOND PROJECT.ppt   MR. YAMADA   5/18 13:57 |
| HOLDING A FLESHMAN WELCOME   MR. FUJITA   5/20 10:24 | /COMMON/PROJECT MATERIAL/IN 2001/ |
| PARTY | THIRD DEVELOPMENT DEPARTMENT MEETING PROCEEDINGS.txt |
| EDUCATION GUIDE IS AVAILABLE   MS. YAMASHITA   5/18 14:35 | MR. UEDA   5/18 9:32 |
| FAULTY SERVER   MR. SUZUKI   5/15 10:11 | /THIRD DEVELOPMENT DEPARTMENT/DEPARTMENT |
| SHARED PRINTER HAS BEEN   MR. SUZUKI   5/14 16:49 | MEETING PROCEEDINGS/ |
| REPAIRED | MARKET RESEARCH SEMINAR REPORT.doc   MS. FUKUSHIMA 5/17 |
|  | 10:15 |
|  | /FIRST DEPARTMENT/EDUCATION/MEETING REPORT/SEMINAR/ |
|  | WINTER MODEL   MR. MURATA   5/15 14:03 |
|  | /COMMON/PROCESS/IN 2001/WINTER/ |
|  | FIRST PROJECT.ppt   MR/ SUZUKI   5/13 22:05 |
|  | /COMMON/PROJECT MATERIAL/IN 2001/ |

| ELECTRONIC CONFERENCE ROOM (IN ORDER OF RECORDING DATE AND TIME) | INFORMATION COLLECTION (IN ORDER OF RECORDING DATE AND TIME) |
|---|---|
| HAS HIT UPON NEW PROJECT   MR. KAWASAKI   5/19 9:34 | DISTRIBUTION OF SEASON PASS   GENERAL AFFAIRS SECTION |
| /PROJECT IDEA/FOR WINTER/ | 5/18 10:02 |
| RELATING TO QUESTIONNAIRE   MR. OTA   5/16 15:00 | RELEASE OF NEW PRODUCT   PUBLIC RELATIONS SECTION |
| RESULT | 5/17 14:00 |
| MERCHANDISE RESEARCH/CAMPAIGN/ | OBTAINING INFORMATION THROUGH QUESTIONNAIRE |
| THREE CODING METHODS SUGGESTED   MR. NAKANO   5/16 11:58 | GENERAL AFFAIRS SECTION |
| /KNOW-HOW/DEVELOPMENT/PROGRAMMING/ | 5/17 11:14 |
| AGREE WITH RELAX ROOM   MR. KAMIYA   5/15 17:24 | PERSONNEL CHANGE (NOTIFICATION)   GENERAL AFFAIRS SECTION |
| /FREE ROOM/OFFICE ENVIRONMENT/ | 5/16 20:46 |
|  | POWER FAILURE (NOTIFICATION)   GENERAL AFFAIRS SECTION |
|  | 5/13 9:32 |
|  | VISION OF THE COMPANY   PRESIDENT   5/12 15:18 |

FIG. 8

| | 16-1 | 16-2 | 16-3 | 16-4 | 16-5 | 16-6 |
|---|---|---|---|---|---|---|
| | RECORDING DATE AND TIME | MESSAGE BOARD ID | MESSAGE BOARD NAME | TITLE | RECORDER | TEXT |
| 15-1 | 20010520 1543 | 3 | RESIDENT ARTICLE | COUNTERMEASURE AGAINST VIRUS (2) | MR. SUZUKI | NEWLY GENERATED VIRUS... |
| 15-2 | 20010520 1024 | 2 | GENERAL AFFAIRS SECTION | HOLDING A FRESHMEN WELCOME PARTY | MR. FUJITA | FRESHMEN THIS YEAR... |
| 15-3 | 20010518 1435 | 1 | EDUCATION SECTION | EDUCATIONAL GUIDE IS AVAILABLE | MS. YAMASHITA | THE EDUCATION OF EMPLOYEE IN MIDDLE STANDING IN FIRST HALF OF 2001,... |
| 15-4 | 20010515 1011 | 2 | GENERAL AFFAIRS SECTION | FAULTY SERVER | MR. SUZUKI | THE PRINT SERVER ON 5F IS FAULTY... |
| 15-5 | 20010514 1649 | 2 | GENERAL AFFAIRS SECTION | SHARED PRINTER HAS BEEN REPAIRED | MR. SUZUKI | SINCE THE SHARED PRINTER HAS BEEN REPAIRED... |
| 15-6 | 20010512 1337 | 2 | GENERAL AFFAIRS SECTION | HOLDING A CLOSING PARTY | MR. FUJITA | IN CELEBRATION OF THE COMPLETION OF THE DEVELOPMENT OF THE NEW MODEL... |
| 15-7 | 20010510 1234 | 3 | RESIDENT ARTICLE | COUNTERMEASURE AGAINST VIRUS | MR. SUZUKI | THOSE WHO USE WINDOWS 2000 ARE REQUESTED TO IMMEDIATELY ... |
| | .. | .. | .. | .. | .. | .. |

FIG. 9

GROUPWARE

MESSAGE BOARD (IN ORDER OF RECORDING DATE AND TIME)

| | | |
|---|---|---|
| COUNTERMEASURE AGAINST VIRUS | MR. SUZUKI | 5/20 15:43 |
| ('2) COUNTERMEASURE AGAINST VIRUS | MR. SUZUKI | 5/10 12:34 |
| HOLDING A FLESHMAN WELCOME PARTY | MR. FUJITA | 5/20 10:24 |
| EDUCATION GUIDE IS AVAILABLE | MS. YAMASHITA | 5/18 14:35 |
| FAULTY SERVER | MR. SUZUKI | 5/15 10:11 |
| SHARED PRINTER HAS BEEN REPAIRED | MR. SUZUKI | 5/14 16:49 |

ELECTRONIC CONFERENCE ROOM (IN ORDER OF RECORDING DATE AND TIME)

| | | |
|---|---|---|
| HAS HIT UPON NEW PROJECT /PROJECT IDEA/FOR WINTER/ | MR. KAWASAKI | 5/19 9:34 |
| RELATING TO QUESTIONNAIRE RESULT | MR. OTA | 5/16 15:00 |
| MERCHANDISE RESEARCH/CAMPAIGN/ THREE CODING METHODS SUGGESTED | MR. NAKANO | 5/16 11:58 |
| /KNOW-HOW/DEVELOPMENT/PROGRAMMING/ AGREE WITH RELAX ROOM | MR. KAMIYA | 5/15 17:24 |
| /FREE ROOM/OFFICE ENVIRONMENT/ | | |

DOCUMENT MANAGEMENT (IN ORDER OF RECORDING DATE AND TIME)

| | | |
|---|---|---|
| SECOND PROJECT.ppt /COMMON/PROJECT MATERIAL/IN 2001/ | MR. YAMADA | 5/18 13:57 |
| THIRD DEVELOPMENT DEPARTMENT MEETING PROCEEDINGS.txt /THIRD DEVELOPMENT DEPARTMENT/DEPARTMENT MEETING PROCEEDINGS/ | MR. UEDA | 5/18 9:32 |
| MARKET RESEARCH SEMINAR REPORT.doc /FIRST DEPARTMENT/EDUCATION/MEETING REPORT/SEMINAR/ | MS. FUKUSHIMA | 5/17 10:15 |
| WINTER MODEL LINE DRAWING.xt1 /COMMON/PROCESS/IN 2001/WINTER/ | MR. MURATA | 5/15 14:03 |
| FIRST PROJECT.ppt /COMMON/PROJECT MATERIAL/IN 2001/ | MR/ SUZUKI | 5/13 22:05 |

INFORMATION COLLECTION (IN ORDER OF RECORDING DATE AND TIME)

| | | |
|---|---|---|
| DISTRIBUTION OF SEASON PASS | GENERAL AFFAIRS SECTION | 5/18 10:02 |
| RELEASE OF NEW PRODUCT | PUBLIC RELATIONS SECTION | 5/17 14:00 |
| OBTAINING INFORMATION THROUGH QUESTIONNAIRE | GENERAL AFFAIRS SECTION | 5/17 11:14 |
| PERSONNEL CHANGE (NOTIFICATION) | GENERAL AFFAIRS SECTION | 5/16 20:46 |
| POWER FAILURE (NOTIFICATION) | GENERAL AFFAIRS SECTION | 5/13 9:32 |
| VISION OF THE COMPANY | PRESIDENT | 5/12 15:18 |

| RECORDING DATE AND TIME | MESSAGE BOARD ID | RESIDENT FLAG | MESSAGE BOARD NAME | TITLE | RECORDER | TEXT |
|---|---|---|---|---|---|---|
| 20010518 1435 | 1 | 0 | EDUCATION SECTION | EDUCATIONAL GUIDE IS AVAILABLE | MS. YAMASHITA | THE EDUCATION OF EMPLOYEE IN MIDDLE STANDING IN FIRST HALF OF 2001,… |
| 20010515 1011 | 2 | 0 | GENERAL AFFAIRS SECTION | FAULTY SERVER | MR. SUZUKI | THE PRINT SERVER ON 5F IS FAULTY… |
| 20010514 1649 | 2 | 0 | GENERAL AFFAIRS SECTION | SHARED PRINTER HAS BEEN REPAIRED | MR. SUZUKI | SINCE THE SHARED PRINTER HAS BEEN REPAIRED… |
| 20010512 1337 | 2 | 0 | GENERAL AFFAIRS SECTION | HOLDING A CLOSING PARTY | MR. FUJITA | IN CELEBRATION OF THE COMPLETION OF THE DEVELOPMENT OF THE NEW MODEL… |
| 20010510 1234 | 3 | 1 | RESIDENT ARTICLE | COUNTERMEASURE AGAINST VIRUS | MR. SUZUKI | THOSE WHO USE WINDOWS 2000 ARE REQUESTED TO IMMEDIATELY … |
| .. | .. | .. | .. | .. | .. | .. |

RESIDENT FLAG OF 1 INDICATES RESIDENT ARTICLE

F I G. 1 1

INFORMATION LIST GENERATION APPARATUS AND RECORDING MEDIUM STORING PROGRAM THEREOF

BACKGROUND OF THE INVENTION

1. Field of the Invention

The present invention relates to an information list generation apparatus for listing on a terminal equipment the information such as an article posted to a message board, received electronic mail, etc., and more specifically to an information list generation apparatus for displaying important information in a visible and higher priority position in the listing regardless of newer or older records.

2. Description of the Related Art

Recently, the information communications network technology has made remarkable progress. It can be, for example, a message board function for enabling a plurality of users to browse information on an electronic message board presented on a Web page through a network such as Internet, etc. as a system of groupware often used in a LAN (local area network). As for groupware, with the current spread of the WWW, all or a part of the functions of most products can be used through a Web browser. Normally, on these message boards, each user can record information (hereinafter referred to as an article).

An article recorded latest is assigned the highest priority, and each article is listed according to the assigned priority. Normally, the priorities are set in order from the highest portion on the listing. Therefore, the last recorded article is set as the highest order article according to the above mentioned priority setting method, and listed on top of the listing.

FIG. 1 shows an example of the listing of articles on the message board of the conventional groupware system. In FIG. 1, a display 2 of the groupware is shown on a display screen 1 by the Web browser. The display 2 includes four types of information listings, that is, a message article list 3 of a message board, a comment information list 4 of an electronic conference room, a recorded document list 5 for document management, and a message collection list 6 of an information collection. These listings are displayed with a remark 'in order from the newest information' enclosed by parentheses. That is, the information is displayed in order from the latest recording date.

In the message article list 3 of the message board, the message from Ms. Yamashita as titled 'education is available', dated May 18 14:35 is displayed on top, followed by the message from Mr. Suzuki as titled 'the faulty server', dated May 15 10:11, followed by the message again from Mr. Suzuki as titled 'the shared printer has been repaired', dated May 14 16:49, followed by the message from Mr. Fujita as titled 'holding a closing party', dated May 12 13:37, and finally followed by the message from Mr. Suzuki as titled 'a countermeasure against virus', dated May 10 12:34.

On the listings of the above mentioned example, a predetermined number (five articles in this example) of articles are displayed after being extracted from all recorded articles in order from the latest recording date. Thus, with the conventional message board, when an article is newly recorded in the database, the listing data is generated from the recorded information about the database containing the newly recorded article. Therefore, the article recorded previously and shown on the listing is sequentially lowered in priority, thereby displaying the predetermined number of newer articles in order from the highest priority as an updated result. The number of listed articles in all articles is predetermined (five articles in this example) by a display instruction.

Thus, in the conventional message board technology, a newly recorded article lowers the display priority of the currently recorded articles. As a result, the article whose updated priority is lower than the predetermined number cannot be displayed on the listing any more although it is important information.

Furthermore, although important articles are listed, a newly recorded article is assigned a higher priority regardless of the importance level. Therefore, a less important article can be frequently displayed in a higher position in priority than a more important article, thereby causing the more important article to be preceded and invisible by other less important articles.

SUMMARY OF THE INVENTION

The present invention has been developed to solve the above mentioned problems, and aims at providing an information list generation apparatus and a program thereof so that more important information in the recorded information can be constantly and visibly listed by priority.

To attain the above mentioned object, the information list generation apparatus according to the present invention includes: a specific information determination unit for determining whether or not there is specific recorded information in the recorded information obtained from an information source; and a listing data generation unit for generating listing data including the recorded information extracted based on a predetermined condition and the specific recorded information if it exists.

The above mentioned listing data generation unit is configured such that the specific recorded information can be displayed in a higher priority position on the listing. In addition, the listing data generation unit can also be configured such that the specific recorded information can be displayed with an attribute different from that of other recorded information on the listing. Furthermore, the listing data generation unit can be configured such that, for example, an instruction about the specific recorded information can be detected to accept a request to immediately display the specific recorded information.

Next, the program according to the present invention directs a computer to realize the process of generating listing data for listing the recorded information obtained from an information source, and is configured to direct the computer to determine whether or not the obtained recorded information contains specific recorded information, and, if it contains the specific recorded information, generate the listing data including recorded information extracted based on a predetermined condition and the specific recorded information.

The program is configured in generating the listing such that, for example, the specific recorded information can be displayed in a higher priority position in the listing. In addition, the program is configured in generating the listing such that, for example, the specific recorded information can be displayed with an attribute different from that of other recorded information in the listing. Furthermore, the program is configured in generating the listing such that, for example, an instruction about the specific recorded information can be detected to accept a request to immediately display the recorded information.

According to the present invention, when a listing is changed when new information is recorded with the above mentioned configuration, important information already recorded on the message board can be resident in the listing regardless of the lapse of time after the information is recorded, thereby preventing the user from overlooking important information.

Similarly, since important information is constantly displayed on the listing regardless of the recording date, the importance of the information can appeal to each user.

Additionally, since important information can be constantly displayed regardless of the recording date even with a smaller number of pieces of information to be listed, it is not necessary to increase, as in the conventional technology, the number of pieces of information to be listed so as to display important information for a long period. Therefore, the display space for a listing can be reduced, and it is not necessary to reduce the variations of information when they are displayed together on a single screen.

BRIEF DESCRIPTION OF THE DRAWINGS

FIG. 3 shows the configuration of the data of the message board database according to an embodiment of the present invention;

FIG. 4 is a flowchart of the process performed between the information list generation apparatus and a client terminal based on the message board database according to an embodiment of the present invention;

FIG. 5 shows an example of displaying the groupware of the Web page displayed on the display screen of the client terminal based on the process of the information list generation apparatus according to an embodiment of the present invention;

FIG. 6 shows an example of changing the groupware display when a new article is recorded on the message board DB according to an embodiment of the present invention;

FIG. 8 shows an example of the data contents of the message board DB updated according to another embodiment of the present invention;

FIG. 9 shows an example of displaying the groupware on the display screen of the client terminal based on the process of the information list generation apparatus according to another embodiment of the present invention;

FIG. 11 shows an example of another data structure of the message board DB.

DESCRIPTION OF THE PREFERRED EMBODIMENTS

Figure 1:
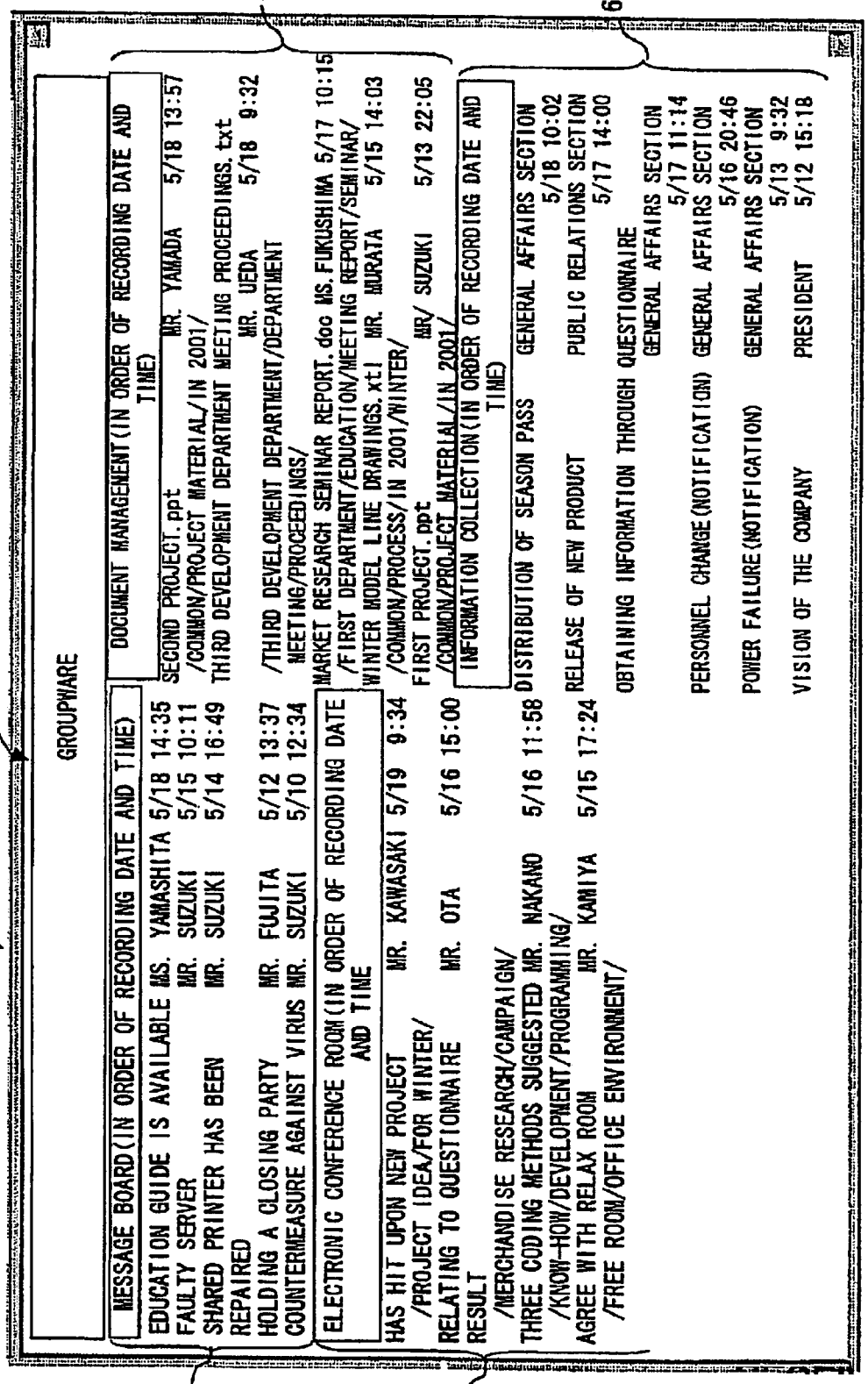
FIG. 1 shows an example of a listing of articles on a message board according to the conventional groupware system.
Figure 2:
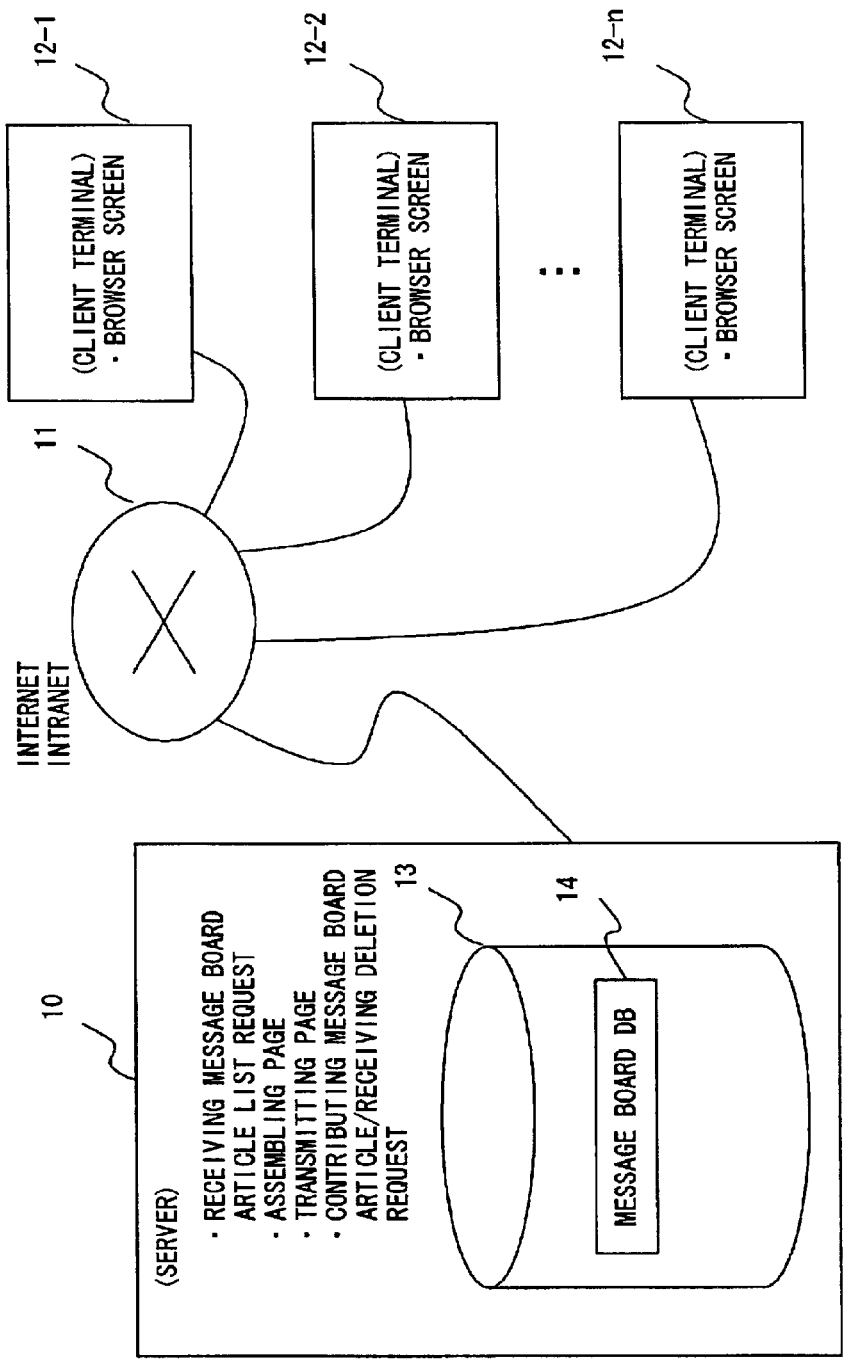
FIG. 2 shows the configuration of the entire system with the information list generation apparatus according to an embodiment of the present invention.

FIG. 2 shows the configuration of the entire system using the information list generation apparatus according to an embodiment of the present invention. As shown in FIG. 2, an information list generation apparatus 10 is connected to a network 11 operated through a TCP/IP protocol of Internet, Intranet, etc. A plurality of client terminals 12 (12-1, 12-2, . . . , 12-n) used by recorded members are connected to the network 11.

The information list generation apparatus 10 is a Web server (device), and provided with a mass storage device 13, a central operation processing unit (not shown in FIG. 2) for controlling the storage device 13, a memory device, a monitor device, a data input device, a communications device, etc. connected to the central operation processing unit through a bus and an interface device.

The storage device 13 is provided with a program (not shown in FIG. 2) for realizing the normal functions of the Web server, a groupware program having the function for performing the processes according to the present invention, and plug-in software functioning in cooperation with the groupware program. The programs for use in the present invention can obviously be provided not only as plug-in software, but also as the groupware program.

The information list generation apparatus 10 is mounted for communication with the above mentioned 12, and other servers not shown in FIG. 2 through an in-house LAN designed through, for example, Intranet, and Internet externally.

Furthermore, the storage device 13 is provided with a message board database 14 (hereinafter referred to as a message board DB 14 as each of other databases is also referred to as a DB) processed by the above mentioned groupware function and required by the groupware system in the present invention, and various databases such as a member information DB, an electronic conference room DB, a schedule DB, a document management DB, etc. (not shown in FIG. 2).

In the member information DB, the name, the ID, and the password of a member participating the groupware system of the present invention, the number of displayed pieces (a predetermined number of displays described later) of leading information for each category displayed on the display screen, etc. are recorded in advance.

Furthermore, a Web browser is installed in each client terminal 12. Through the Web browser, information is transmitted and received between the Web server (software) and the HTTP (Hyper Text Transfer Protocol) in the information list generation apparatus 10. A member inputs his or her own ID and password using an appropriate client terminal 12, and the Web browser allows the member to record and browse the information managed by the groupware.

Described below are the processes performed by the information list generation apparatus 10 with the above mentioned system configuration. According to the embodiment, the explanation is given by referring to an example of a message board DB. However, the processes performed in the information list generation apparatus 10 by the Web server (software) by transmitting and receiving information to and from the Web browser of the client terminal 12 are not limited to those relating to the message board DB, but many other processes, for example, the process of displaying other information listing databases such as the above mentioned member information DB, electronic conference room DB, schedule DB, document management DB, etc. is also preferably performed.

In the process relating to a message board described below, the information list generation apparatus 10 performs the processes of accepting a request for a message board article list from the client terminal 12, assembling the Web page for display on the client terminal 12 in the display format according to the present invention, transmitting the assembled Web page to the client terminal 12, accepting a request to contribute or delete a message board article from the client terminal 12, etc. using the article management information (each piece of data forming part of a database) about the message board DB 14.

FIG. 3 shows the configuration of the data of the message board DB 14. On the message board DB 14 shown in FIG. 3, one article forms a record 15 (15-1, 15-2, 15-3, . . . ). Fields 16 (16-1, 16-2, . . . , 16-6) in each record 15 store information about a recording date and time, a message board ID, a message board name, a title, a recorder, and text as article management information.

The information stored in the recording date and time 16-1 indicates the date and time on which the article (text) of the record is contributed to the Web server through the Web browser using the Web page, and is recorded in the message board DB 14. On the message board DB 14, each record is stored in the order of recording date and time. For example, the information '200105181435' about the recording date and time of the record 15-1 indicates that the article, that is, the record 15-1, has been recorded at 14:35 on May 18, 2001.

The information about the message board ID 16-2 indicates the identification information for unique designation of a message board in plural types of message boards classified by contents. The information about the message board name 16-3 indicates the name of the message board corresponding to the message board ID 16-2. The information about the title 16-4 indicates the title of the article. The information about the recorder 16-5 indicates the name of the contributor (member) of the article recorded as the record 15. The information about the text 16-6 indicates the text of an article.

The explanation below is given in consideration of the text 16-6 storing the recorded text of the article. To be correct, the text 16-6 stores the name of the file storing the text of the article. When the text is displayed, the contents of the file indicated by the file name are used. The date and time information about the recording date and time 16-1 also indicates the generation and recording date and time of the file storing the text.

In the embodiment, as indicated by the record 15-5, the message board whose information about the field of the message board ID 16-2 is 3 refers to a specific message board on which a resident article is recorded. Furthermore, according to the present embodiment, a plurality of fields corresponding to one article are put in one record. For example, the message board name 16-3 can also be managed as one of other DBs corresponding to the message board ID 16-2.

FIG. 4 is a flowchart of the process performed between the information list generation apparatus 10 and the client terminal 12 based on the message board DB 14 with the above mentioned configuration.

FIG. 5 shows an example of displaying the groupware of the Web page on the display screen of the client terminal 12 based on the above mentioned process.

The processes performed by the information list generation apparatus 10 for the client terminal 12 is described below by referring to FIGS. 4 and 5.

First, the client terminal 12 issues a request to assemble a page to the information list generation apparatus 10 through the network 11 (step S1). In this process, a member invokes the initial screen of the groupware system using an appropriate client terminal 12, inputs his or her own ID and password for authentication, and requests to transmit the page data including the listing of the message board generated by the process of the present invention on the screen. Practically, the URL corresponding to the Web page is transmitted.

Upon receipt of the above mentioned request to assemble a page, the information list generation apparatus 10 (hereinafter referred to as a server) accesses the message board DB 14 of the storage device 13 shown in FIG. 3, and retrieves the resident articles from the article management information of each record 15 in order from the latest recording date and time of a file (step S3). This process is performed by searching the message board DE 14, and extracting the records 15 of the specific message board ID 16-2 (storing '3' in this example) in order from the latest recording date and time stored in the recording date and time 16-1. These records 15 are recorded as 'resident articles' of the text 16-6 as the information about the message board name 16-3 indicates 'resident'.

In the example of the message board DB 14 shown in FIG. 3, the record indicating '3' in the message board ID 16-2 is only one, that is, the record 15-5. Therefore, there is only one resident article extracted in order from the latest recording date and time in the above mentioned searching process.

Then, according to the resident article extracted as described above, the resident article list on the page to be displayed is assembled (step S4). In this process, display data is generated based n the three pieces of field data of the title 16-4, the recorder 16-5, and the recording date and time 16-1 of the record 15-5 of the resident article extracted in the above mentioned retrieval. The display attribute (display color of characters and the background of the article, etc.) of the resident article is set for the display data.

That is, as shown in the top row of a message board display 19 of a groupware display 18 on a Web page 17 shown in FIG. 5, Web page display data is assembled in the format in which the data including the title 'countermeasure against virus', the recorder name 'Mr. Suzuki', and the recording date and time 'May 10, 12:34' is displayed in a line.

Then, the server determines whether or not the number of the records 15 of the resident articles extracted in the above mentioned search is smaller than a predetermined displays (five in this example) recorded in advance in the message board listing number field of the record of the member of the member information DB as the number of articles displayed on the message board article listing 19 for the member (step S5).

If it is smaller (YES in S5), then an article other than the resident articles (hereinafter referred to as a normal article) is retrieved from the article management information of the message board DB 14, and the records of normal articles are extracted. The number of normal articles to be extracted is obtained in order from the latest recording date and time by subtracting 'the number of resident articles extracted in step 3' from 'the predetermined number of articles to be displayed' (step S6).

In the present embodiment, the predetermined number of displayed articles is set to 5, and the number of extracted resident articles is 1. Therefore, the difference is 4. That is, in the process in step S6, four records of normal articles are extracted in order from the latest recording date and time. In the example of the message board DB 14 shown in FIG. 3, four records, that is, the record 15-1 having the latest recording date and time and storing 1 in the field of the message board ID 16-2, and the three records 15-2, 15-3, and 15-4 having the next latest recording dates and times storing 2 in the fields of the message board ID 16-2 are extracted. When the number of resident articles recorded in the message board DB 14 is 0, the number '0' of the resident articles is subtracted from the number '5' of articled to be displayed. Since the difference is 5, five normal articles are extracted. If the number of the resident articles is 5, the number 5 of the resident articles is subtracted from the predetermined number 5 of the articles to be displayed. Since the difference is 0, no normal articles are extracted.

In the above mentioned processes, the server assembles a normal article list on a page to be displayed (step S7). In this process, the display data is generated based on the three pieces of field data, that is, the title 16-4, the recorder 16-5, and the recording date and time 16-1 for each of the records 15 (15-1, 15-2, 15-3, 15-4) of a normal article extracted in the above mentioned search.

That is, in the above mentioned example, the display data of the title 'education guide is available', the recorder 'Ms. Yamashita', and the recording date and time 'May 18, 14:35 (year data is omitted) is generated for the record 15-1. The display data of the title 'faulty server', the recorder 'Mr. Suzuki', and the recording date and time 'May 15, 10:11 (year data is omitted) is generated for the record 15-2. The display data of the title 'shared printer has been repaired.', the recorder 'Mr. Suzuki', and the recording date and time 'May 14, 16:49 (year data is omitted) is generated for the record 15-3. In addition, the display data of the title 'holding a closing party', the recorder 'Mr. Fujita', and the recording date and time 'May 12, 13:37 (year data is omitted) is generated for the record 15-4. Thus, the display data of four normal articles can be assembled.

The assembled display data of normal articles is added to the end of the display data of the 'countermeasure against virus' of resident articles incorporated into the message board article listing 19, and the configured Web page data is transmitted to the client terminal 12 from the information list generation apparatus 10 (step S8). The client terminal 12 which receives the Web page data displays the Web page on the display screen of the display device as shown in FIG. 5 (step S9).

As shown in FIG. 5, the message board article listing 19 displays data relating to the title 'countermeasure against virus' specified as a resident article in the first line corresponding to the top priority although it has the oldest recording date and time. Since FIG. 5 is a monochrome drawing, it is not clear that the resident article is displayed with the background color of yellow as an attribute assigned to the display data in step S4.

Subsequently, normal articles are displayed in order from the latest recording date and time headed by the data relating to the title 'education guide is available', followed by the data relating to the title 'faulty server', the title 'shared printer has been repaired', and finally followed by the data relating to the title 'holding a closing party'.

Although not shown in the above mentioned flowchart, if a member double clicks the display line of the 'countermeasure against virus' of the resident article using a pointer, then it indicates the request to immediately display the recorded information of the resident article by the effect of the link tag of the display line configured by the HTML. As a result, the request is transmitted from the Web browser to the server 10. Upon receipt of the immediate display request, the server 10 reads the information about the text 16-6 of the resident article from the message board DB 14, and transmits the Web page data to the client terminal 12.

Using the received Web page data, the member can be immediately informed of the contents of the article from the title by reading the text of the resident article displayed on the client terminal 12.

The above mentioned listing can be displayed in either a predetermined number display mode or an all data display mode. If a message board listing is pointed to and active, and the all data display mode is specified by a predetermined button not shown in FIG. 5, then the display screen is switched into a listing of the titles of all data of the recorded articles, the recorders, and the recording dates and times on the message board.

FIG. 6 shows an example of a change in the groupware display when a new article is recorded in the message board DB 14. In this example, the message board DB 14 shown in FIG. 2 has a new record of a normal article having the recording date and time '200105201024', the message board ID of 2, the message board name 'general affairs section', the title 'holding a freshmen welcome party', and the recorder 'Mr. Fujita' although they are not shown in the attached drawings. As a result of the new record, the process shown in FIG. 4 is performed based on the message board DB 14 updated by the new record.

Consequently, the resident article displayed on top in priority as shown in FIG. 5, and titled 'the countermeasure against virus' is still displayed on the message board display 19' in the groupware display 18' on page Web page 17' shown in FIG. 6. The display is followed by the newly recorded normal article titled 'holding a freshmen welcome party' having the latest recording date and time, and followed by the three normal articles having the next latest recording dates and times. The normal article titled 'holding a closing party' in the lowest priority position as shown in FIG. 5 is not displayed any longer in FIG. 6 because the number of articles to be displayed is limited to the predetermined number of five.

Thus, although a new record is made with the latest recording date and time as shown in FIG. 6 on the message board article listing, the existing resident article is displayed in a higher listing display area in the process shown in FIG. 4 only if the new article is a normal article. The normal articles are sequentially displayed in order from the latest recording date and time from the next display priority position.

In the above mentioned example, in the display shown in FIG. 6 updated from the display shown in FIG. 5, there is only one resident article titled 'countermeasure against virus'. However, if a resident article is newly recorded, then the existing resident articles and the new resident article are displayed on the message board article listing 19 or 19'. In this case, the number of displays of normal articles is reduced by the number of resident articles.

In the explanation in step S4 in the flowchart shown in FIG. 4, the displays on the Web pages 17 and 17' shown in FIGS. 5 and 6 cannot be clearly displayed because the figures are monochrome. Therefore, the descriptions of color displays are omitted here. In the process in step S4, when the resident article list on the page is practically generated, for example, the black characters are used and the background color (ground color) is white for the normal articles while the black characters are used and the background color is yellow for the resident articles. Thus, by using different background colors between resident articles and normal articles, the resident articles can be clearly distinguished from the normal articles. It is obvious that the background color of the resident articles is not limited to yellow. That is, it can be reddish, or any color other than red or yellow.

In the example above, with an increasing number of resident articles, the number of displayed normal articles in the predetermined number of displayed articles decreases. However, the number of displayed articles can also be designed such that the normal articles having later recording dates and times than resident articles can be displayed in a predetermined range although the number of resident articles increases. It is described below as another embodiment of the present invention.

Figure 7:
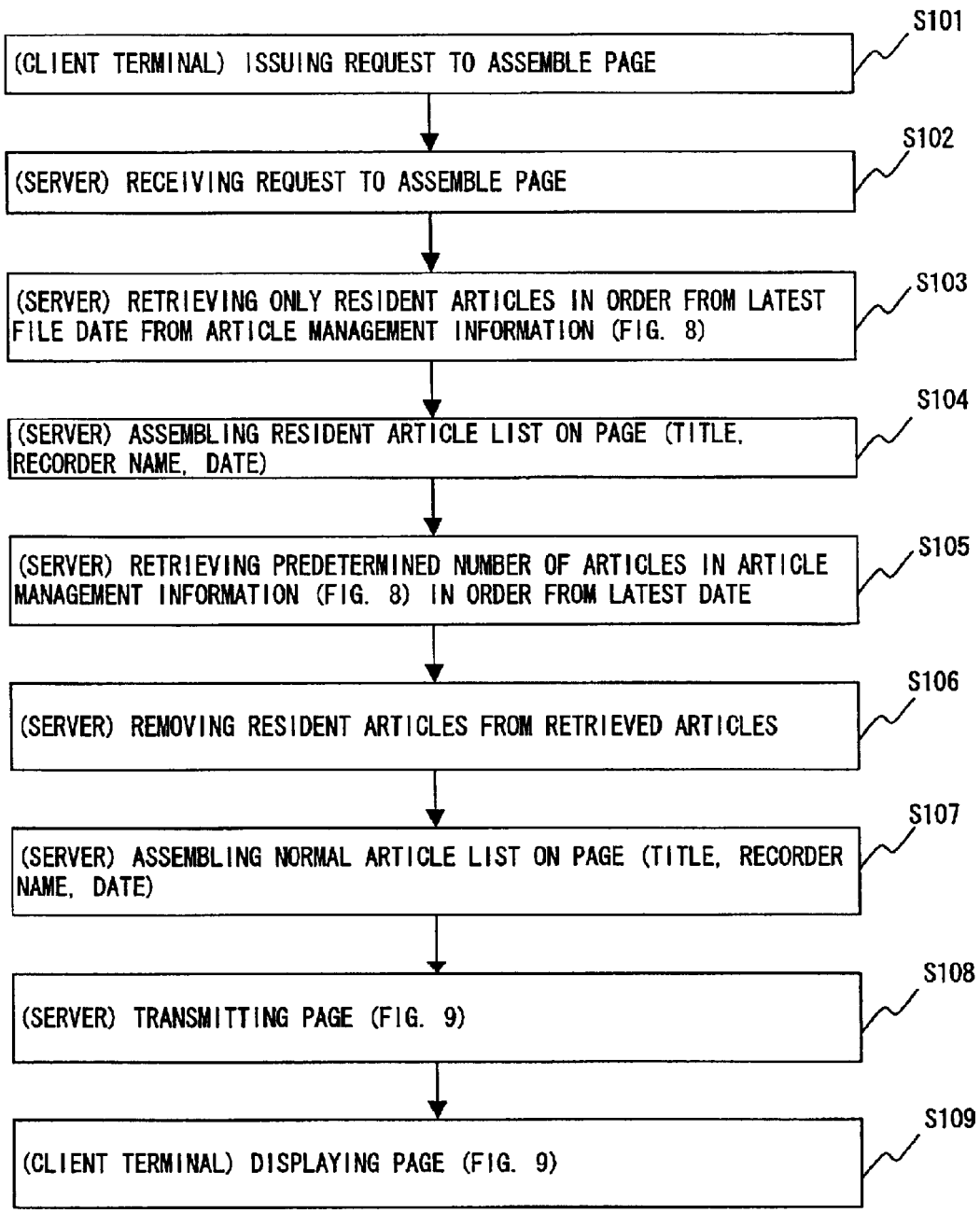
FIG. 7 is a flowchart of the process performed between the information list generation apparatus and a client terminal according to another embodiment of the present invention.

FIG. 7 is a flowchart of the process performed between the information list generation apparatus 10 and the client terminal 12 according to another embodiment of the present invention. The entire configuration of the system including the information list generation apparatus 10 is the same as the configuration shown in FIG. 2.

FIG. 8 shows the contents of the data of the message board DB 14 updated prior to this process. The message board DB 14 shown in FIG. 8 has the above mentioned new entry of the record 15-2 of a normal article having the recording date and time '200105201024', the message board ID '2', the message board name 'general affairs section', the title 'holding a freshmen welcome party', and the recorder 'Mr. Fujita'. In addition, there is a new entry of the record 15-1 of a resident article having the recording date and time '200105201543', the message board ID '3', the message board name 'for resident article', the title 'countermeasure against virus (2)', and the recorder 'Mr. Suzuki'. Since FIG. 8 shows the database storing records in order from the latest recording date and time, the branch number of the record 15 having an older recording date and time is shifted to a lower priority position (assigned a larger number) than in FIG. 3.

FIG. 9 shows an example of displaying the groupware of the Web page displayed on the display screen of the client terminal 12 based on the above mentioned process.

The process performed in the information list generation apparatus 10 for the client terminal 12 according to the embodiment of the present invention is described below by referring to FIGS. 7 through 9.

First, in the process shown in FIG. 7, the processes in steps S101 through S104 are respectively the same as the processes in steps S1 through S4 in the flowchart shown in FIG. 4. That is, in these processes, all resident articles are extracted from the message board DB 14 shown in FIG. 8, and a resident article list is assembled on the Web page.

That is, in this example, two resident article listings are generated in order from the latest recording date and time of resident articles, that is, the article having the recording date and time 'May 20, 15:43', and the title 'countermeasure against virus (2) (the recorder 'Mr. Suzuki'), followed by the article having the recording date and time 'May 10, 12:34', and the title 'countermeasure against virus (the recorder 'Mr. Suzuki').

Next, in step S105 shown in FIG. 7, a predetermined number of articles are retrieved in order from the latest recording date and time from all articles in the management information on the message board DB 14. Also in this process, a predetermined number of records 15 to be displayed (five records in this example) are retrieved from the records recorded in advance in the message board listing number field of the record of the member in the member information DB. Therefore, the records 15-1 through 15-5 are retrieved from the message board DB 14 shown in FIG. 8.

In step S106, the resident articles are removed from the retrieved articles. In this process, since the records 15 of the resident articles have already been retrieved in the processes up to step S104, these records 15 are removed. However, since five records 15 have been retrieved from all articles in order from the latest recording date and time, no record 15-7 of older resident articles are included in the five records 15. Therefore, removing the records 15 of the resident articles from among the extracted five records 15 refers to removing only one record 15-1 of the resident article having a new recording date and time. Then, the four normal article records 15-2 through 15-5 remain as the extracted records.

In step S107, the list data for a groupware display page is generated by adding the display list of the four normal articles to the display list of two resident articles.

The subsequent processes in steps S108 and S109 are relatively the same as the processes in steps S8 and S9 in the flowchart shown in FIG. 4. That is, the data for the above mentioned groupware display page is transmitted to the client terminal 12, and displayed on the display device of the client terminal 12 as the message board display 19" of the groupware display 18" of the Web page 17" shown in FIG. 9.

In the example shown in FIG. 9, the two resident articles 'countermeasure against virus (2)' and 'countermeasure against virus' and the four normal articles including 'holding a freshmen welcome party', that is, a total of six articles are displayed.

Thus, although a predetermined number of articles to be displayed is five as in this example, more than five articles including resident and normal articles can be displayed when there are normal articles having later recording dates and times than old resident articles.

For example, when the recording dates and times of resident articles are older than any of the recording dates and times of five normal articles, the listing of the message board displays the five normal articles preceded by the leading resident articles regardless of the number of the resident articles. That is, in the process according to the embodiment shown in FIG. 4, the normal articles are not listed if there are five or more resident articles. On the other hand, in the present embodiment, normal articles can be displayed on the listing regardless of the number of resident articles only if the recording date and time of a normal article is the late recording date and time.

According to the present embodiment, if five resident articles are recorded, and the recording dates and times of the five resident articles are the latest, only the five resident articles are displayed on the listing of the message board without any display of a normal article. That is, in this case, the same result as the result shown in FIG. 4 is obtained.

Figure 10:
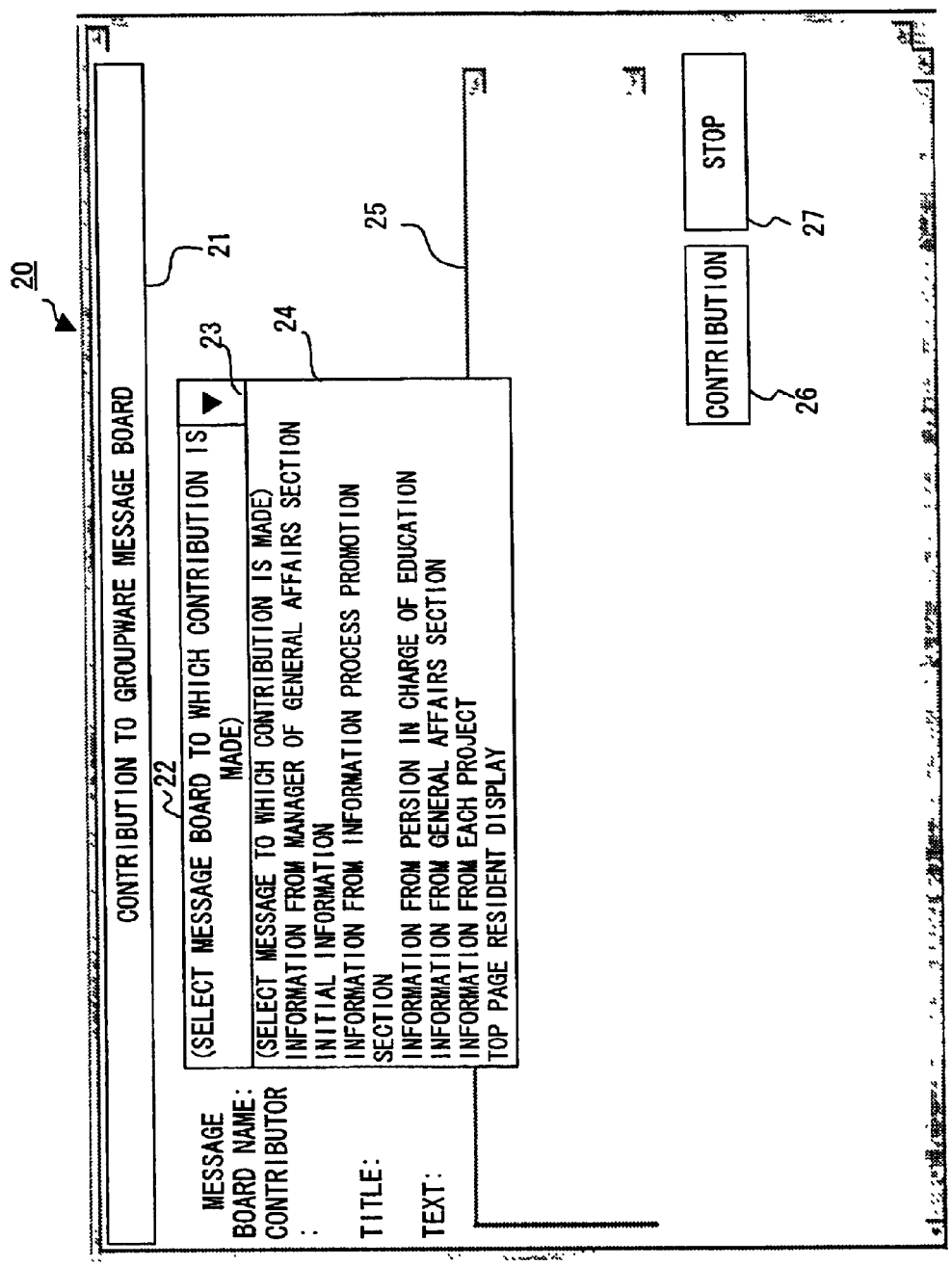
FIG. 10 shows an example of a display screen provided for the Web browser of the client terminal from the server when an article is contributed and recorded in the message board DB.

FIG. 10 shows an example a display screen of the article contribution form provided for the Web browser of the client terminal 12 from the server 10 when a member contributes and record an article from the client terminal 12 to the above mentioned message board DB 14. As shown in FIG. 10, an article contribution form display screen 20 has a title display 21 of 'contribution to the groupware message board' on top of the window followed by data input guides of, and in this order, a 'message board name:', a 'contributor:', a 'title:', and 'text:'. On the right of the 'message board name:', a small window 22 is display indicating the guide text for selection of the type of the message board to which a contribution is made. On the right of the small window 22, a downward triangular button 23 is displayed.

FIG. 10 shows the state in which a pull-down menu 24 is displayed by clicking pointer on the downward triangular button 23. The pull-down menu 24 shows the types of message boards from top to bottom. Thus, there are a plurality of message boards (message board names), and a member can make a contribution of an article to any message board.

When a resident article according to the present invention is to be contributed, the member selects the message board name for a resident display of a specific message board. In the example shown in FIG. 10, the menu for 'top page resident display' is shown at the bottom of the pull-down menu 24, and the menu for the 'top page resident display' is displayed as inverse video by the member selecting it using the pointer or the cursor.

Thus, after selecting the type of the message board, data is input according to the input guide display of each of other items 'contributor:', 'title:', and 'text:'. When the 'contributor:' or the 'title:' is selected by the pointer, the pull-down menu 24 of the message board names disappears, and the contributor name and the title can be input into the revealing input windows 'contributor:' and 'title:'. Below these windows, text can be input into a large text input window 25.

After all data have been input, a 'contribution' button 26 in the two buttons in the lower positions of the form displayed as the 'contribution' button and the 'stop' button is pressed (clicked) to transmit the above mentioned input data to the server 10. When the contribution is canceled, a 'stop' button 27 is pressed to disappear the display screen without performing any process.

Upon receipt of the input data transmitted by clicking the contribution button 26, the new record 15 is added to the message board DB 14 shown in FIG. 3 or 8, and the input recording date and time is stored in the field of the recording date and time 16-1 of the record 15, the type of the message board selected by the 'message board name:' is stored in the field of the message board name 16-3, the corresponding ID number is stored in the field of the message board ID 16-2, the title name input by the 'title:' is stored in the field of the title 16-4, the contributor name input by the 'contributor:' is stored in the field of the recorder 16-5, and the text input into the text input window 25 of the 'text:' is stored in the field of the text 16-6.

FIG. 11 shows an example of another data structure of a message board DB. In the above mentioned embodiments of the present invention, an article contributed to a specific message board is processed as a resident article. In a message board DB 28 shown in FIG. 11, each record is provided with a resident flag field 16-7, and the resident flag field 16-7 of the record of a resident article is set to 1 so that the record having the resident flag field 16-7 set to 1 can be retrieved when resident articles are retrieved.

With the configuration, the display of the article contribution form provided for the Web browser of the client terminal 12 (refer to FIG. 10) has a check box to indicate whether or not a resident flag is to be set. Thus, a member can easily select whether a contributed article is to be a resident article or a normal article.

The above mentioned embodiments of the present invention are explained by referring to an example of a message board article listing. However, the present invention is not limited to this application. For example, in a received mail listing, a user (member) can select received mail to be displayed as a resident article so that, even when mail is newly received, the mail set as the resident article can be controlled to be constantly displayed in a higher priority display position. That is, the present invention can be applied to a system and software for updating information listing when new information is recorded.

What is claimed is:

1. An information list generation computing apparatus which generates listing data of recorded information obtained from an information source, comprising:

a determination unit determining whether or not there is specific recorded information in the obtained recorded information; and a generation unit generating listing data including recorded information extracted based on a predetermined condition and the specific recorded information when there is the specific recorded information and setting the specific recorded information to be displayed in a high priority position in a listing with a predetermined variety of an attribute selected from a predetermined character color, font type or background color different from the attribute varieties of other recorded information in the listing.

2. The apparatus according to claim 1, wherein said generation unit detects an instruction for the specific recorded information, and sets a request to immediately display the recorded information to be accepted.

3. A computer readable storage medium storing a program for directing a computer to realize a process of generating listing data for display of a listing of recorded information obtained from an information source, comprising:

determining whether or not there is specific recorded information in the obtained recorded information; and generating listing data including recorded information extracted based on a predetermined condition and, when present, the specific recorded information for display a high priority position in a listing with a predetermined variety of an attribute selected from a predetermined character color, type or background color different from the attribute varieties of other recorded information in type listing.

4. The computer readable storage medium according to claim 3, wherein said generating the listing data includes detecting an instruction for the specific recorded information, and setting a request to immediately display the recorded information to be accepted.

5. A computer method of generating listing data for listing of information from an information source, comprising:

extracting, based on a predetermined condition, recorded information from the information obtained from the information source;

determining whether specific recorded information is included in the recorded information; and generating listing data, including display attributes, for the recorded information, where the specific recorded information, when present, has a high priority position in the listing with the display attributes including at least one of a predetermined character color, font type and background color different from the display attributes of other recorded information in the listing.

6. A method as recited in claim 5, wherein the information source is part of a groupware system.

7. A method as recited in claim 6, further comprising updating the listing data when new information is received from the information source with the specific recorded information maintained in the high priority position and newly received other recorded information following the specific recorded information in the listing.

8. A method as recited in claim 7, wherein when the recorded information has a defined order for the listing, all of the specific recorded information is listed first in the defined order, followed by any other recorded information listed in the defined order.

* * * * *

UNITED STATES PATENT AND TRADEMARK OFFICE
CERTIFICATE OF CORRECTION

PATENT NO. : 6,910,046 B2
DATED : June 21, 2005
INVENTOR(S) : Masaaki Daimon et al.

It is certified that error appears in the above-identified patent and that said Letters Patent is hereby corrected as shown below:

Column 12,
Line 30, after "color," insert -- font --.
Line 32, replace "type" with -- the --.
Line 39, replace "computer" with -- computer-implemented --.

Signed and Sealed this

Seventh Day of February, 2006

JON W. DUDAS
*Director of the United States Patent and Trademark Office*